United States Patent

[11] 3,607,310

[72] Inventor James F. Carter, Jr.
19005 Bryant St., Northridge, Calif. 91324
[21] Appl. No. 568,989
[22] Filed July 29, 1966
[45] Patented Sept. 21, 1971

[54] PRODUCTION OF FORTIFIED SUGAR
9 Claims, 3 Drawing Figs.

[52] U.S. Cl. .................................................. 99/141, 99/11
[51] Int. Cl. ..................................................... A23l 1/26
[50] Field of Search ........................................... 99/2, 141, 142, 11; 127/30; 167/82; 424/34

[56] References Cited
UNITED STATES PATENTS

| | | | |
|---|---|---|---|
| 2,640,778 | 3/1951 | Owen | 99/11 |
| 2,764,485 | 9/1956 | Bash et al. | 99/11 |
| 2,974,043 | 3/1961 | Hochberg | 99/4 |
| 3,080,293 | 3/1963 | Koff | 167/81 |
| 2,694,668 | 11/1954 | Fricke | 167/81 |
| 2,970,056 | 1/1963 | Benson et al. | 99/143 |
| 3,037,911 | 6/1962 | Stoyle et al. | 167/81 |
| 3,497,589 | 2/1970 | Borenstein et al. | 424/31 |

OTHER REFERENCES

The Bakers Digest Vol. 33 #5 (Oct. 1959) pps. 56–58

*Primary Examiner*—Lionel M. Shapiro
*Assistant Examiner*—Roger B. Andewelt
*Attorney*—Wood, Herron & Evans ABSTRACT: Producing fortified beet cane or corn sugar identical in appearance to the unfortified sugar product by mixing a combination of coated nutrients, unfortified sugar and a masking agent, the mixing accompanied by a minimum of breaking of the nutrient coating.

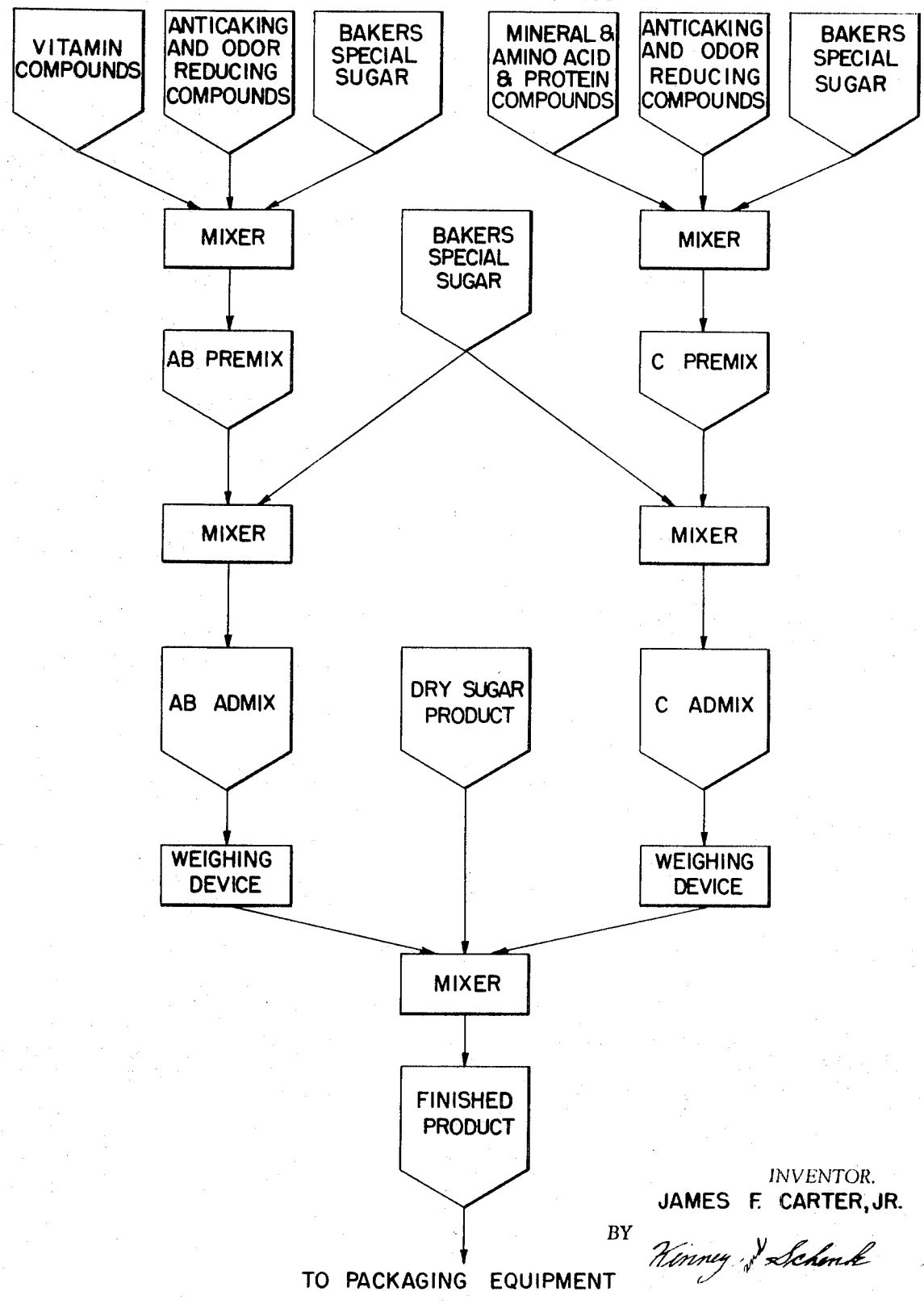

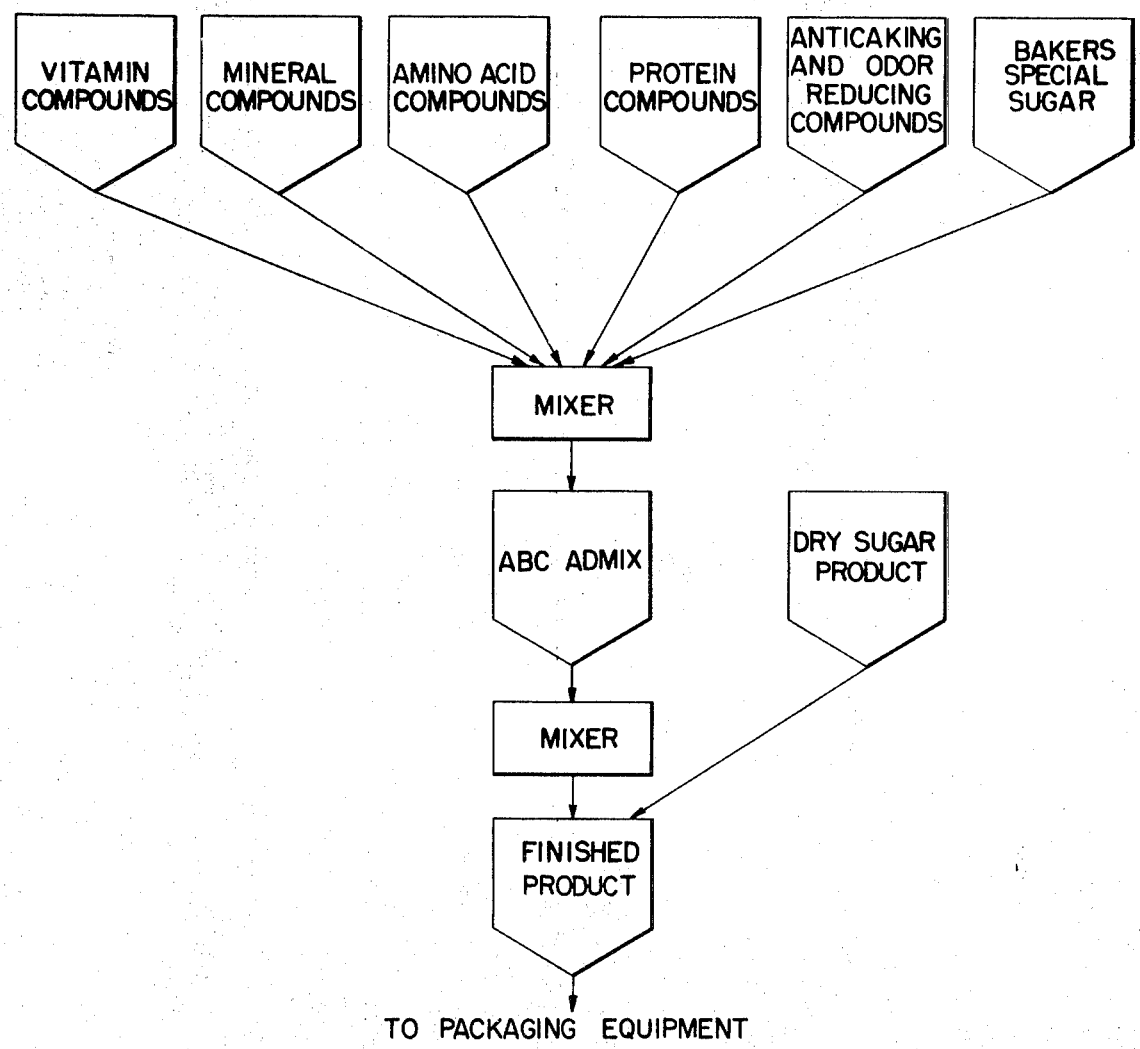
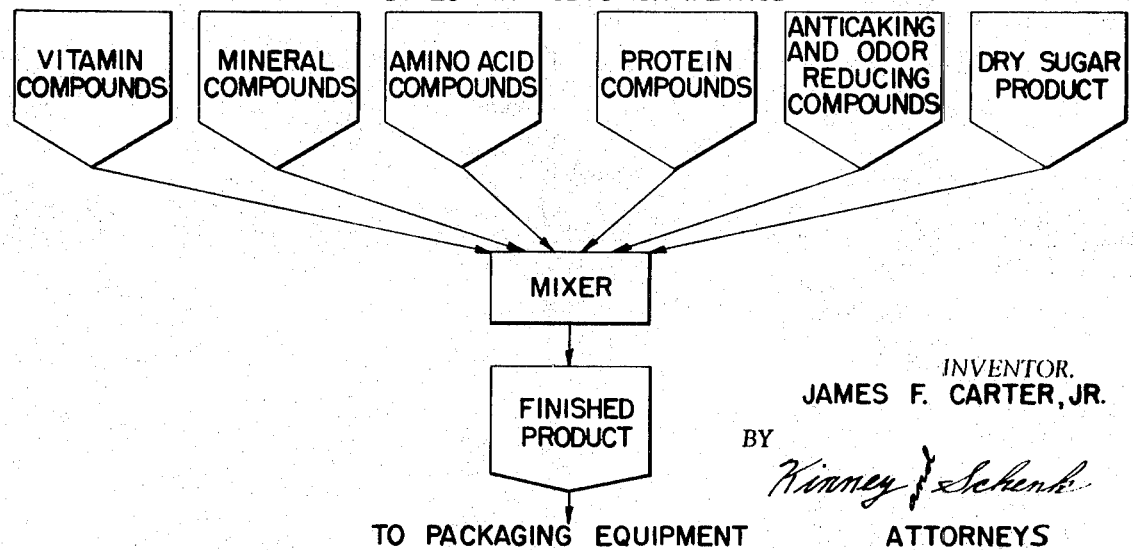

PRODUCTION OF FORTIFIED SUGAR

This invention pertains to the production of sugar and more particularly to the production of sugar having high nutritional properties.

It has long been considered desirable to fortify sugar used for human consumption with vitamins, minerals, or the like. However, previous efforts to add such fortifying substances have resulted in the production of sugar having an undesirable appearance and/or taste.

Accordingly, it is a feature of this invention to provide a fortified sugar for human consumption which does not have an undesirable appearance or taste.

Another feature of this invention is to provide such fortified sugar in a simple and economical manner.

Another feature of this invention is to provide an improved method of fortifying sugar with vitamins, minerals, and the like.

Another feature of this invention is to provide an improved method of producing such fortified dry sugar.

Another feature of this invention is to provide an improved method of producing such fortified liquid sugar.

Another feature of this invention is to provide such improved method of producing such fortified sugar having an appearance and taste superior to presently available unfortified sugar.

Therefore, it is an object of this invention to provide fortified sugar and an improved method of producing such fortified sugar having one or more of the novel features of this invention as set forth above or hereinafter shown or described. Other objects, uses, and advantages of this invention are apparent from a reading of this description which proceeds with reference to the accompanying drawings forming a part thereof and wherein:

FIG. 1 is a schematic flow diagram of what will be referred to as a multiple dilution method of producing fortified dry sugar.

FIG. 2 is a schematic flow diagram of what will be referred to as single dilution method of producing fortified dry sugar.

FIG. 3 is a schematic flow diagram showing a direct introduction method of producing fortified dry sugar. While the various features of this invention are hereinafter illustrated and described as being particularly adaptable to providing fortified sugar and an improved method of producing such fortified sugar for human consumption, it will be appreciated that the various method steps may be used singly or in any combination thereof to provide fortified sugar for other commercial uses as desired.

Therefore, this invention is not to be limited to only the exemplary method steps illustrated in the drawings.

The improved method to be subsequently described in detail is fully applicable to dry sugar irrespective of whether such sugar is provided in granular, powdered, flake, or similar dry form. In addition, such dry sugar, to be fortified, may be made from cane, beet, or corn sugar or any combination thereof.

In using the improved method of this invention to fortify liquid sugar, such method is fully applicable to liquid cane, beet, corn, or other similar liquid sugar product. Also, such liquid sugars may be used singly or in any desired combination in a Brix range of 40° to 90° and preferably within a most desirable range of 50° to 80° Brix.

The final fortified sugar product whether in the dry or liquid form may contain any or all of the following nutrients as well as other water soluble and fat soluble vitamin, mineral, amino acid, and protein type nutrients. The nutrients may appear in any of the forms listed below from 10 micrograms (mcg) to 7 grams of nutrients, per 100 grams of final product dry sugar or per 100 grams of bone dry sugar in solution in the case of liquid sugar.

The weight of such nutrient is expressed in terms of weight per 100 grams of final fortified dry sugar product. In the case of liquid sugar the weight of each nutrient is expressed in terms of weight per 100 grams of equivalent dry fortified product. With this explanation it will be appreciated that the amount shown for each nutrient is fully applicable to both dry and liquid sugar.

Each nutrient is shown in tabular form with the weight of each nutrient per 100 grams being presented in two columns to indicate the acceptable weight range and the most desired or optimum weight range.

Certain of the listed nutrients are followed by the letter D in parenthesis or the letter L in parenthesis to designate that such nutrients are preferably only used in the process of fortifying dry or liquid sugar respectively. In fact throughout this specification, the use of the letter D or L in parenthesis will indicate applicability to dry or liquid sugar respectively. Where the letter D or L does not follow the listed nutrients or materials such nutrients are used in both dry and liquid fortified sugar.

| Vitamin type nutrients | Range | Most desired range |
|---|---|---|
| Vitamin B₁ as: | | |
| Thiamine hydrochloride, mg | 0.1–1.5 | 0.5–1.0 |
| Thiamine mononitrate, mg | 0.1–1.5 | 0.5–1.0 |
| Coated thiamine hydrochloride (D), mg | 0.1–1.5 | ¹ 0.5–1.0 |
| Coated thiamine mononitrate (D), mg | 0.1–1.5 | ¹ 0.5–1.0 |
| Vitamin B₂ as: | | |
| Riboflavin, mg | 0.1–1.5 | 0.5–1.0 |
| Riboflavin phosphate (sodium), mg | 0.1–1.5 | 0.5–1.0 |
| Coated riboflavin (D), mg | 0.1–1.5 | ¹ 0.5–1.0 |
| Coated riboflavin phosphate (sodium) (D), mg | 0.1–1.5 | ¹ 0.5–1.0 |
| Vitamin B₃ as: | | |
| Niacin, mg | 1.0–15 | 5–10 |
| Niacinamide, mg | 1.0–15 | 5–10 |
| Coated niacin (D), mg | 1.0–15 | ¹ 5–10 |
| Coated niacinamide (D), mg | 1.0–15 | ¹ 5–10 |
| Vitamin B₅ as: | | |
| Pantothenic acid, mg | 0.5–4.0 | 1.0–3.0 |
| Calcium pantothenate, mg | 0.5–4.0 | 1.0–3.0 |
| Coated pantothenic acid (D), mg | 0.5–4.0 | ¹ 1.0–3.0 |
| Coated calcium pantothenate (D), mg | 0.5–4.0 | ¹ 1.0–3.0 |
| Vitamin B₆ as: | | |
| Pyridoxine hydrochloride, mg | 0.1–1.5 | 0.5–1.0 |
| Coated pyridoxine hydrochloride (D), mg | 0.1–1.5 | ¹ 0.5–1.0 |
| Vitamin B₁₂ as: Cobalamine, mcg | 0.1–1.5 | 0.5–1.0 |
| Vitamin A as: | | |
| Vitamin A acetate, U.S.P. units | 200–600 | 300–500 |
| Vitamin A palmitate, U.S.P. units | 200–600 | 300–500 |
| Acetate or palmitate in water dispersible oil solution (L), U.S.P. units | 200–600 | 300–500 |
| Beta caratine (L), U.S.P. units | 200–600 | 300–500 |
| Vitamin D₂, U.S.P. units | 20–60 | 30–50 |
| Vitamin D₂ in water dispersible oil solution (L), U.S.P. units | 20–60 | 30–50 |
| Vitamin E as: | | |
| Alpha tocopherol, I.U. | 1–5 | 2–4 |
| Alpha tocopheryl, I.U. | 1–5 | 2–4 |
| Alpha tocopheryl succinate, I.U. | 1–5 | 2–4 |
| Vitamin K | (²) | (²) |
| Ascorbic acid, mg | 1.0–5.0 | 2.0–4.0 |
| Biotin, mg | .005–.030 | 0.010–0.020 |
| Inositol, mg | 2.0–10.0 | 3.0–5.0 |
| Folic acid | (²) | (²) |
| Para-aminobenzoic acid | (²) | (²) |
| Betaine or betain hydrochloride, mg | 1.0–20.0 | 5.0–15.0 |
| Lipoic acid, mg | 0.1–2.0 | 1.5–1.5 |
| Choline citrate, mg | 50–300 | 150–250 |
| Choline bitartrate, mg | 50–300 | 150–250 |

¹ Calculated in terms of pure product.
² Trace.

Mineral Nutrients
Compounds:
di basic calcium phosphate
di basic Potassium Phosphate
Mono Sodium Phosphate
Sodium Chloride
Magnesium sulfate Ferric Citrate
Manganous sulfate
Mono potassium phosphate
Calcium Lactate
Iron reduced by Hydrogen (D) −325 mesh
Potassium iodide
Ferric Gluconate
Magnesium sulfate
Ferric Phosphate (D)

|  | Range | Most desirable range |
|---|---|---|
| Minerals on elemental basis only: | | |
| Calcium, mg | 5–400 | 5–100 |
| Manganese, mg | 1–8 | 2–6 |
| Potassium, mg | 50–200 | 75–150 |
| Mangesium, mg | 50–150 | 80–120 |
| Iodine, mg | 0.01–0.20 | .05–1.5 |
| Phosphorus, mg | 100–300 | 150–250 |
| Sodium, mg | 100–300 | 150–250 |
| Iron, mg | 1–10 | 3.0–6.0 |
| Copper | (1) | (1) |
| Cobalt | (1) | (1) |
| Amino acid compounds: | | |
| Glycine, mg | 50–200 | 75–150 |
| Phenylalamine, mg | 1.0–20 | 5.0–15.0 |
| Alamine, mg | 0.1–2 | 0.5–1.5 |
| Leucine, mg | 0.1–2 | 0.5–1.5 |
| Tryptophan, mg | 0.01–0.2 | 0.05–0.15 |
| Methionine, mg | 50–200 | 75–150 |
| Lysine, mg | 0.1–2.0 | 0.5–1.5 |
| Tyrosine, mg | 0.5–10.0 | 3.0–7.0 |
| Protein: | | |
| Gelatine, mg | 50–200 | 75–150 |
| Casein, mg | 50–200 | 75–150 |

1 Trace.

The following are the most desirable ones used in producing fortified dry sugar.
Coated Thiamine Mononitrate
Coated Riboflavin
Niacin
Coated Calcium Pantathenate
Coated Pyridoxine Hydrochloride
Cobalamine
Vitamin A Acetate
Vitamin $d_2$
Alpha Tocopheryl Succinate
Vitamin K
Ascorbic Acid
Monosodium phosphate
Monosopotassium phosphate
Calcium Lacatate
Iron reduced by hydrogen (−325 mesh)
Potassium Iodide
Sodium Chloride The following nutrients are the most desirable ones in producing fortified liquid sugar.
Thiamine Hydrochloride
Riboflavin Phosphate (Sodium)
Niacinamide
Pantothentic Acid
Pyridoxine Hydrochloride
Cobalamine
Vitamin A Palmitate in water dispersible oil solution or dry Vitamin A Palmitate or Beta Caratine
Vitamin $D_2$ in Water dispersible oil solution or dry Vitamin $D_2$
Alpha Tocopheryl Succinate in a water dispersible oil solution or dry
Vitamin E in Water dispersible oil solution or dry
Ascorbic Acid
di basic Calcium Phosphate di basic Potassium Phosphate
Ferric Citrate
Ferric Gluconate
Potassium Iodide
Sodium Chloride All nutrients must be "food grade" or better and such reference to food grade indicates that the nutrients, compounds, etc. must be certified to qualify under the provisions of Federal Food, Drug, and Cosmetic Act. The most desirable amounts of nutrients to be added range from 1 mg. to 1000 mg. of nutrients per 100 grams of finished product. And in the case of liquid sugar, the same range per 100 grams of bone dry sugar in liquid finished product.

The improved method of this invention assures that the final product of fortified sugar does not have an objectionable color or odor. In the case of dry fortified sugar the nutrients previously listed are preferably coated with edible masking compounds, for example, edible stearic acid compounds. Such coated nutrients, are available commercially from companies such as Hoffman-LaRoche, Inc. Nutley, N. J.; and Merck and Company, Teteboro, N. H., for example. In the case of vitamin nutrients the vitamins are coated so that the end vitamin product is 10 percent to 60 percent vitamin by weight and preferably within a most desirable weight range of 20 percent to 40 percent.

In order to reduce and practically eliminate vitamin odor in fortified sugar, surface active absorption and/or adsorption compounds such as, silica gel, magnesium trisilicate, silicic acid, and Cab–0 –Sil M–5 produced by Godfrey L. Cabot, Inc. These compounds serve both as anticaking agents and odor removing agents.

Any one or more of the anticaking and odor removing agents may be added at a level ranging from 0.001 percent to 5 percent by weight of the finished product and preferably within a most desirable range by weight of 0.005–0.30 percent of finished product. It has been found through tests that silica gel and Cab-O-Sil M–5 produce optimum anticaking and odor removing action.

Of course, all compounds must be food grade or better and all nutrients and anticaking and odor reducing compounds must pass a 30 mesh screen or smaller.

To reduce the possibility of any hydroscopic compounds collecting moisture during processing of fortified dry sugar, the processing and packaging equipment must be maintained at 10 percent to 70 percent relative humidity at 75° F. Preferably such equipment is maintained within a most desirable range of 40 percent to 50 percent relative humidity at 75° F.

Contamination of the fortified sugar is reduced by providing handling surfaces made of stainless steel, 61ST or 2S aluminum, or equivalent. Furthermore, it has been demonstrated that by transmitting a minimum amount of mechanical work to the sugar product being fortified, a product identical in appearance to regular unfortified sugar is produced. The method of this invention assures that only such minimum work is performed as necessary to provide the desired nutrient distribution.

The method steps employed to produce fortified dry sugar which does not have an objectionable odor and which is either identical or better in appearance than similar unfortified dry sugar will now be described and various modifications of such method steps will be presented One series of method steps for producing dry fortified sugar (shown in FIG. 1 of the drawings) will be referred to as the multiple dilution method and comprises preparing a first premix (which will be referred to as the AB AB Premix), preparing a second premix (which will be referred to as the C Premix), preparing a first admix (referred to as AB Admix) using the AB Premix therein, preparing a second admix (referred to as C Admix) using the C Premix therein, and finally suitably mixing together the proper amounts of AB Admix, C Admix, and dry sugar product to produce the final fortified sugar product.

The AB Premix is prepared by adding the proper amounts of vitamin type compounds, anticaking and odor reducing compounds, and a small amount of Bakers special sugar or equivalent to a Blender of appropriate size and blending. The AB Premix may range from 0.001 percent to 0.5 percent by weight of the final fortified sugar product with the most desirable weight range being 0.01 percent to 0.10 percent.

The C Premix is prepared by adding the proper amounts of mineral compounds, amino acid compounds, protein compounds, anticaking and odor reducing compounds, and a small amount of Bakers special sugar or equivalent to a blender of appropriate size and blending. It is not necessary to have compounds present from every group mentioned above in order to provide an acceptable C Premix. C Premix may range from 0.01 percent to 3 percent by weight of the final sugar product with the most desirable weight range being 0.1 percent to 1.0 percent.

The AB Premix and C Premix are separately suitably blended. In each case any suitable blender may be used: however, a twin shell tumble blender of the type having an intensifier bar is preferred. For both the AB Premix and C Premix, a blending time ranging from 1 to 10 minutes is generally sufficient for satisfactory results but optimum results are obtained when blending within a time range of 3 to 6 minutes.

The twin shell tumble blender has the appearance of being formed from an elongated right circular cylindrical body cut at an angle and joined together along the cut line to form a "V" shape. The axis of rotation is located at a point that provides equal torque loading throughout a full rotation.

The twin shell blender combines the action of the inclined cylinder with the intermeshing action that occurs when the two inclined cylinders combine their flows and is the fastest of the precision blenders.

The previously mentioned intensifier bar previously mentioned comprises and internal device to break up small agglomerates in the material being mixed.

Other types of blenders which have been successfully used for both AB Premix and C Premix comprise the ribbon blender and double cone blender using the same blending times as previously mentioned.

The AB Admix is prepared by adding the proper amount of AB Premix and the proper amount of Bakers special sugar or the equivalent in a suitable blender and blending. AB Admix may range from 0.5 percent to 5.0 percent by weight range is 1.0 percent to 3.0 percent.

The C Admix is prepared by adding the proper amount of C Premix and the proper amount of Bakers special sugar or equivalent in a suitable blender and blending. C Admix may range from 2 percent to 6 percent by weight of the final fortified product with the most desirable range being 3.0 percent to 5.0 percent.

The AB Admix and C Admix are separately suitably blended. In each case a twin shell tumble blender of the type previously described is preferably used either with or without intensifier bar. For both the AB Admix and C Admix, a blending time ranging from 3 to 30 minutes has been found sufficient; however, for optimum results a blending time of 10 to 20 minutes is preferably used.

The double cone type blender has also been successfully used, blending the time periods mentioned, in blending both AB Admix and C Admix.

The final fortified dry sugar product is obtained by placing the proper amount of AB Admix, C Admix, and dry sugar product in a suitable blender and suitably blending.

The final blending action is preferably accomplished using a continuous solids—solids blender. A blending time ranging from 0.5 to 5 minutes (for batch blenders only) is used. The optimum final blending time has been found to range between 1 and 3 minutes.

The continuous solids—solids blender essentially comprises a number of the previously described twin shell tumble blenders joined together and inclined so that a preset amount of feed will flow through the blender to thereby give the same blending results as the twin shell blender yet in a continuous manner. As in the case of a twin shell blender, an intensifier bar may be used if desired.

A large variety of other blender types may be employed for finally mixing the finished product comprising the ribbon blender, twin shell tumble blender, double cone blender, continuous double agitator mixer, and continuous mixing screw conveyor.

Another series of method steps for producing dry fortified sugar referred to as the single dilution method will now be described (see FIG. 2 of the drawings) and comprises preparing a first admix (which will be referred to as ABC Admix); and finally suitably mixing together the proper amount ABC Admix and dry sugar product in a suitable blender and blending.

The ABC Admix is prepared by adding the proper amounts of vitamin type compounds, mineral type compounds, Amino Acid type compounds, protein type compounds, anticaking and odor reducing compounds a small amount of Bakers special sugar or equivalent in a suitable blender and blending. ABC Admix may range from 0.5 percent to 6.0 percent by weight range is preferably 0.7 percent to 2.0 percent.

The ABC Admix is preferably suitably blended in a twin shell tumble blender with an intensifier bar which operates as previously described. A blending time ranging from 3 to 30 minutes has been found acceptable; however, the most desired blending time is 10 to 20 minutes.

Other types of blenders which have been successfully used with the ABC Admix have been the twin shell blender without intensifier bar and the double cone blender.

The final fortified product is prepared by adding together the proper amount of ABC Admix and dry sugar product to a suitable blender and blending. The preferred blender is a continuous solids—solids blender of the type previously described.

The final blending has been satisfactorily achieved by blending over a time interval of 0.5 to 5 minutes. The preferred blending time is 1 to 3 minutes. The longer times in each instance are applicable to batch blenders.

Other types of blenders have also been satisfactorily used in the final step of mixing ABC Admix and sugar and comprise the twin shell tumble blender, continuous double agitator blender, continuous mixing screw conveyor and double cone blender.

It may be preferred to mix the various constituents together by what will be referred to as the direct introduction method. A schematic flow diagram of the direct introduction method is shown in FIG. 3 of the drawings. In the direct introduction method the proper amounts of vitamin type compounds, mineral type compounds, Amino Acid type compounds, protein type compounds, anticaking and odor reducing compounds and dry sugar product are added to an appropriate size and type blender and blended.

The blending action in the direct introduction method is preferably accomplished in a continuous solids—solids blender having an intensifier bar. The action of such a blender was described previously and blending time ranging between 1 to 10 minutes has been found satisfactory. The preferred blending time being 2 to 6 minutes with the mentioned larger times being applicable to batch blenders.

Other types of blenders which have been successfully used with the direct introduction method are the same as the acceptable blenders mentioned in connection with the final mixing step of the single introduction method and thus will not be repeated.

Having disclosed the various nutrients (also listing the most desirable nutrients) that may be added to the fortified sugar of this invention, the anticaking and odor removing agents, etc. two exemplary process runs for producing dry fortified sugar will now be presented as accomplished by the multiple dilution method, refer also to FIG. 1. The first process run presented will be typical of dry sugar fortified with an exemplary maximum amount of nutrients. The second process run will be typical of dry sugar fortified with an exemplary minimum amount of nutrients.

For the first process run AB Premix in an amount sufficient for 20,000 lbs. of finished fortified dry sugar product is prepared by passing the following compounds through a 30 mesh screen and introducing such compounds into a twin shell stainless steel blender, for example, of the type previously described. The blending( (mixing) action is accomplished for 5 minutes and the mixed product is held for the AB Admix preparation.

360 grams Thiamine Mononitrate 33 percent Rocoated
RoCoat is a trade designation used by Hoffman-LaRoche, Inc., Nutley, N. J.
408 grams Riboflavin 33 percent Rocoated
300 grams Pyridoxine Hydrochloride 33 percent Rocoated
180 grams Silicic Acid
1362 grams of Bakers Special Sugar
0.2 mg. Cobalamin (Vit. $B_{12}$)
200 grams Calcium Pantothenate
1250 grams Niacin
0.2 mg. Biotin
400 grams Inositol
408 grams Ascorbic Acid
0.2 mg. Para Amino Benzoic Acid
0.3 mg. Alpha Tocopherol Acetate (1210 I.U./gram)
0.25 grams Vitamin $D_2$ (25,000 USP Units/gram)
91 grams Vitamin A Acetate (500,000 USP Units/gram)
900 grams Glycine (Amino Acetic Acid)
450 grams Phenylalanine
90 grams Alanine
90 grams Leucine
9 grams Triptophane
90 grams Methionine C Premix in an amount sufficient for 10,000 lbs. of final fortified sugar product is prepared by passing the following compounds through a 30 mesh screen into a stainless steel twin shell blender and blending for 5 minutes. The mixed product is then held for the C Admix preparation.

22 grams Manganese Sulfate
7.4 grams Potassium Iodide
454 grams Magnesium Trisilicate
7.8 lbs Bakers special Sugar
5 lbs. Choline Bitartrate AB Admix in an amount sufficient for 20,000 lbs. of finished product is prepared by mixing the following in a stainless steel twin shell blender for 15 minutes. The AB Admix preparation is then preferably placed in 100 lb. bags and suitably identified.

361.7 of Bakers Special Sugar
The AB Premix previously prepared

AC Admix in an amount sufficient for 10,000 lbs. of final fortified sugar product is prepared by mixing the following together with the C Premix in a stainless steel twin shell blender for 15 minutes. The C Admix thus prepared is then placed in 100 lb. bags and suitably identified.

108 lbs. Calcium Lactate
1.3 lbs. Iron reduced by Hydrogen −325 mesh
40 lbs. Mono Potassium Phosphate
10 lbs. Sodium Chloride
5 lbs. Anhydrous Magnesium Sulfate
20 lbs. Mono Sodium Phosphate
201.7 lbs. Bakers Special Sugar The final fortified dry sugar product is prepared by mixing the following preferably in a continuous solids—solids blender for 1½ minutes. The various materials are added in the sequence and quantities stated to produce 425 lbs. of the final fortified dry sugar of this invention. The mixing action is repeated as necessary to produce the desired quantities of fortified sugar. Of course, the final product is then transferred to packaging equipment and suitably packaged.

200 lbs. of regular granulated sugar to mixer
4 lbs. AB Admix to mixer
8½ lbs. C Admix to mixer
200 lbs. of regular granulated sugar to mixer
4 lbs. AB Admix to mixer
8½ lbs. C Admix to mixer The maximum content of nutrients in the fortified dry sugar product based on distribution factors will be as tabulated below.

| Nutrient: | Content per 100 grams of finished product |
|---|---|
| Vitamin $B_1$, mg | 1.0 |
| Vitamin $B_2$, mg | 1.2 |
| Vitamin $B_6$, mg | 1.0 |
| Vitamin $B_{12}$ | Trace |
| Calcium pantalhenate, mg | 2.0 |
| Niacin, mg | 11 |
| Biotin | Trace |
| Inosital, mg | 3.5 |
| Vitamin C, mg | 3.0 |
| Para amino benzoic acid | Trace |
| Vitamin E | Trace |
| Vitamin $D_2$ | Trace |
| Vitamin A, U.S.P. units | 400 |
| Glycine, mg | 8.0 |
| Phenylalanine, mg | 4.0 |
| Alanine, mg | 0.8 |
| Leucine, mg | 0.8 |
| Triptophane, mcg | 80 |
| Methionine, mg | 0.8 |
| Chloline bitartrate, mg | 40 |
| Manganise, mg | 0.12 |
| Iodine, mg | 0.1 |
| Magnesium, mg | 10.0 |
| Potassium, mg | 85 |
| Sodium, mg | 50 |
| Sulphur, mg | 10 |
| Silicon, mg | 3.0 |
| Calcium, mg | 110 |
| Iron, mg | 10 |
| Phosphorus, mg | 100 |
| Chlorine, mg | 55 |

The second exemplary process run for preparing fortified dry sugar with a typical minimum amount of nutrients will now be described. This presentation will be abbreviated and essentially in tabular form.

The amounts of AB Premix, C Premix, AB Admix and C Admix prepared will be sufficient to prepare the same amounts of final fortified dry sugar product as in the corresponding mixes previously presented in the first exemplary process run. also the size screens used are the same as before, the blenders used correspond to the previously used ones, and the blending times for the various mixes are the same as previously for corresponding mixes.

Prepare AB Premix by mixing the following and holding for AB Admix preparation.

250 grams Riboflavin 33 percent rocoated
200 grams Thiamine Mononitrate 33 percent rocoated
500 grams Magnesium Trisilicate
2699 grams Bakers Special Sugar Prepare C Premix by mixing the following and holding for C Admix preparation.

15 grams Potassium Iodide
454 grams Magnesium Trisilicate
275 grams Iron reduced by Hydrogen −325 mesh Prepare AB Admix by placing the following in a mixer in the order stated, mixing and then placing the mixture in suitable bags.

200 lbs. of screened Bakers Special Sugar
one-half of the previously prepared AB Premix
166.5 lbs. of screen Bakers Special Sugar The remainder of AB Premix to mixer Prepare C Admix by placing the following in a mixer in the order stated, mixing, and then placing the mixture in suitable bags.

200 lbs. of screened Bakers Special Sugar
one-half of the previously prepared C Premix
190.5 lbs. of screened Bakers Special Sugar The remainder of C Premix to mixer Prepare final fortified dry sugar product by placing the following in a mixer in the order presented and then suitably mixing. The amount of final product thus produced is 425 lbs. which is then packaged as desired.

200 lbs. of regular granulated sugar
4 lbs. of AB Admix
8½ lbs. of C Admix
200 lbs. of regular granulated sugar
4 lbs. of AB Admix
8½ lbs. of C Admix The minimum content of nutrients in finished product based on distribution is as follows:

| Nutrient: | Content per 100 grams of finished product |
|---|---|
| Vitamin $B_1$, mg | 0.6 |
| Vitamin $B_2$, mg | 0.5 |
| Niacin, mg | 5.0 |
| Iodine, mg | 0.1 |
| Iron, mg | 3.0 |

Thus, it is seen that typical examples of fortified dry sugar have been presented in which typical maximum and minimum content of nutrients per given weight of final product have been used.

Reference has been made to various types of blenders throughout this disclosure which have been successfully used in producing fortified dry sugar having an appearance as good as or better than equivalent unfortified sugar and such blenders will now be briefly described.

The ribbon double helical blender comprises a stationary trough-type shell, which is usually two and one-half to three times as long as it is wide, having a semicircular bottom and a longitudinal shaft extending along such bottom on which are mounted arms that support a combination of slender spiral ribbons, flights, paddles or helicals. The outer spiral ribbon usually moves the material to be mixed in one direction and an inner spiral ribbon moves the mixed material in the opposite direction. This provides for continuous axial flow and prevents pileup of material at one end.

The continuous double agitator blender is essentially a modified ribbon blender with 2 helical flights, ribbons or paddles operating parallel to each other in a wide trough. Material moves from one end of the blender to the other.

The continuous mixing screw conveyor comprises another modified ribbon blender in the form of a screw conveyor. Helical flights provided in the screw conveyor are modified to move the material in steps, each step leaving some material to be blended with the material received from the previous step. This blender has the advantage of being a blender while serving as a piece of materials handling equipment.

The double cone blender comprises two cones joined by a short cylinder and the axis of rotation is centrally located on the cylindrical section. The cones usually have a 90° included angle, or a 45° discharge angle. This blender presents a constantly changing flow cross section as the vessel rotates. During rotation, the bottom cone is tilted to a point where the angle of repose of the contents is exceeded. The surface layers roll down toward the opposite cone, followed quickly by the entire mass. As the mass strikes the conical walls much of the material is deflected toward the center and thence upward through the remainder of the mass. Because there is a great difference in the velocities of the various particles, homogeneity quickly results.

Having described the detailed mixing of various materials to produce the improved fortified dry sugar of this invention, the mixing steps required to produce the improved fortified liquid sugar will now be presented.

The first series of method steps which will now be presently described will be referred to as the dry admix batch method. AB and C Admix or ABC Admix as described in the previous detailed description of the dry sugar disclosure are/is added to a given amount of liquid sugar product in a batch tank. The previously described most desirable nutrient forms for liquid sugar are used. The tank is agitated until the nutrients are dispersed and in addition to agitation the product may be recirculated by a suitable pump or a separate recirculation pump. The end product is pumped preferably by a centrifugal pump to its usage point or to the inlet of a homogenizer.

The combination of nutrients and amounts thereof are preferably added in the same ranges shown in the dry section, but calculated on the basis of bone dry sugar product in the liquid.

Another satisfactorily employed technique for producing improved fortified liquid sugar is referred to as the dry admix batch method with homogenization. The procedure is the same as followed in the dry admix batch method with the addition of passing the final product through a homogenizer while using pressure from 100 p.s.i.g. to 2000 p.s.i.g. used to completely disperse all nutrients. The preferred pressure range is pressure between 200 p.s.i.g. to 1200 p.s.i.g.

A third satisfactorily employed series of method steps for producing fortified liquid sugar will be referred to as the liquid admix batch method. This method may be used with or without homogenization.

The first step comprises preparation of liquid admix by adding together the proper amount of any or all of the vitamin type compounds, mineral type compounds, Amino Acid type compounds and protein type compounds along with the proper amount of liquid sugar in a blend tank and agitated. The ratio of various liquid materials used are based on bone dry weights in the ratios used in the dry sugar presentation. In addition to agitation the product may be recirculated by the discharge pump or a separate recirculation pump. The final brix of the liquid admix may or may not be the same as that of the final product.

When the product is thoroughly mixed it is then pumped to a final usage point or through a homogenizer if more dispersion is needed. Homogenizer pressure may range from 100 to 2000 p.s.i.g. but is preferably within 200 p.s.i.g. to 1200 p.s.i.g.

Liquid admix may be produced so that the level of added nutrients ranges from 0.001 percent to 5 percent by volume of the final liquid fortified sugar and is preferably within a range of 0.1 percent to 3 percent.

In some applications it may be desirable to prepare the liquid admix as described above leaving out the liquid sugar product. The liquid admix and liquid sugar product are then metered in proper proportion into a batch tank and agitated to insure proper nutrient distribution. In addition to agitation, the product may be recirculated by the discharge pump or a separate recirculation pump. The blended product is pumped by centrifugal pump to final usage or through a homogenizer if more nutrient dispersion is needed. Homogenizer pressure may range from 100 p.s.i.g. to 2000 p.s.i.g. Most desirable range, 200 p.s.i.g. to 1200 p.s.i.g.

Another series of method steps employed in producing fortified liquid sugar of this invention will be referred to as the chemical pump method. In the chemical pump method a large positive displacement pump pumping liquid sugar is matched with a small positive displacement pump pumping liquid admix. Both pumps feed a common header which in turn feeds a centrifugal pump. Both of such pumps are matched so that the proper amount of liquid admix is metered into the liquid sugar. The products may be blended from 0.001 percent to 5.0 percent liquid admix by volume of the final liquid fortified sugar product and is preferably within a most desirable range of 0.1 percent to 3.0 percent.

The centrifugal pump may pump the blended product to final usage point or through a homogenizer if greater dispersion is required. Homogenizer pressure may range from 100 p.s.i.g. to 2000 p.s.i.g. and is preferably within a range of 200 p.s.i.g. to 1200 p.s.i.g.

It will be appreciated that the above disclosed nutrients, compounds, etc., used to produce the improved fortified sugar of this invention are properly selected to assure that they mix properly with the sugar being fortified to produce a final product having characteristics such as appearance equal to or better than the unfortified product.

Thus, it is seen that an improved fortified sugar has been provided having the desired nutritional additives and having a better appearance and taste than presently available unfortified sugar.

Further, this invention provides an inexpensive and efficient method of producing fortified sugar of superior appearance and quality.

While the form of the invention now preferred has been disclosed as required by statute, other forms may be used, all coming within the scope of the claimed subject matter which follows:

What is claimed is:

1. A method of producing fortified beet, cane or corn sugar for human consumption comprising the steps of, providing an unfortified dry sugar product, providing selected nutrients means of which at least a portion thereof is coated to negate odor and color, providing masking means in addition to said coating for further masking undesirable physical properties such as odor and color of said nutrient means, and mixing said unfortified sugar product, said nutrient means and said masking means using a minimum of mechanical work to mix said ingredients with minimum breaking of said nutrient coating to thereby produce fortified sugar identical in appearance to said unfortified sugar.

2. The method as set forth in claim 1 in which said step of providing nutrient means and masking means comprises providing said nutrient means and masking means capable of passing through a 30 mesh screen.

3. The method as set forth in claim 2 in which said step of providing nutrient means further comprises providing nutrient means ranging in weight from 10 micrograms to 7 grams per 100 grams of final fortified dry sugar product.

4. The method as set forth in claim 3 in which said step of providing masking means comprises providing combined means having anticaking means and odor removing means and mixing said combined means during mixing of said unfortified sugar product and said nutrient means.

5. The method as set forth in claim 4 in which said step of providing said combined means comprises providing said combined means ranging in weight from 0.001 to 5 percent of the final fortified product.

6. The method as set forth in claim 5 in which said step of providing nutrient means and said mixing step include the steps of, providing a first premix of 0.001 to 0.5 percent by weight of the final fortified sugar product and comprising vitamin type nutrients, said combined means, and special mixing sugar means, providing a second premix of 0.01 to 3.0 percent by weight of the final fortified sugar product and comprising mineral nutrients, amino acid compound means, protein compound means, said combined means, and special mixing sugar means, providing a first admix having 0.5 to 5 percent by weight of the final fortified sugar product and comprising said first premix and special mixing sugar means, providing a second admix of 2 to 6 percent by weight of the final fortified sugar product and comprising second premix and special mixing sugar means, and providing a final mix comprising finally mixing said first and second admix and said unfortified sugar product.

7. The method as set forth in claim 6 in which said first and second premix are each suitably mixed for a time interval of from 1 to 10 minutes, said first and second admix are each suitably mixed for a time interval of from 3 to 30 minutes, and said final mix is mixed for a time interval of from 0.5 to 5 minutes, thereby providing said improved fortified sugar product.

8. The method as set forth in claim 5 in which said step of providing nutrient means and said mixing step include the steps of, providing combination admix means of 0.5 to 6 percent by weight of the final fortified sugar product and comprising vitamin nutrients, mineral nutrients, amino acid compound means, protein compound means, said combined means, and special mixing sugar means, and providing a final mix comprising finally mixing said combination admix means and said unfortified sugar product.

9. The method as set forth in claim 8 in which said combination admix means is suitably mixed for a time interval of from 3 to 30 minutes and said final mix is mixed for a time interval of from 0.5 to 5 minutes thereby providing improved fortified dry sugar means.